United States Patent [19]
Lesser

[11] 3,912,937
[45] Oct. 14, 1975

[54] SUBMARINE ELECTRICAL ENERGY GENERATING APPARATUS

[76] Inventor: Jerome M. Lesser, 713 Parkway, Fultondale, Ala. 35068

[22] Filed: July 20, 1973

[21] Appl. No.: 381,077

[52] U.S. Cl. .................. 290/43; 290/54; 416/119; 416/17
[51] Int. Cl.² ........................................ F03B 13/10
[58] Field of Search ............ 290/42, 43, 44, 53, 54, 290/55; 60/398; 416/119, 9, 17; 415/141, 8, 2, 3

[56] References Cited
UNITED STATES PATENTS

| | | | |
|---|---|---|---|
| 857,482 | 6/1907 | Perry | 416/119 |
| 868,798 | 10/1907 | McLaughlin | 290/54 |
| 968,904 | 8/1910 | Warren | 290/4 |
| 993,074 | 5/1911 | Kell | 416/119 |
| 1,083,472 | 1/1914 | Watson | 416/119 |
| 1,275,951 | 8/1918 | Luick | 416/119 |
| 1,314,232 | 8/1919 | Wohr | 416/119 |
| 1,612,025 | 12/1926 | Jankowski | 416/119 |
| 1,645,996 | 10/1927 | McQuiston | 416/119 |
| 1,651,067 | 11/1922 | Nitardy | 416/17 |
| 2,730,631 | 1/1956 | Dandini | 290/54 |
| 3,604,942 | 9/1971 | Nelson | 290/54 |

*Primary Examiner*—G. R. Simmons
*Attorney, Agent, or Firm*—Pennie & Edmonds

[57] ABSTRACT

This invention relates to a submarine electrical energy generating apparatus for utilizing the currents of oceans and seas to generate electricity comprising an electrical generator in a waterproof compartment, a turbine comprising a rotatable shaft having dual pitched wheel vanes extending therefrom and louvers pivotally mounted on said vanes in such manner and so structured so as to be under the constant control of the water current, and means operatively associated with said shaft and said generator for transmitting movement from the shaft to the generator.

7 Claims, 7 Drawing Figures

SUBMARINE ELECTRICAL ENERGY GENERATING APPARATUS

BACKGROUND OF THE INVENTION

There is presently a great deal of concern due to the fact that sources of fossil fuel, such as coal and oil, are rapidly becoming depleted and more expensive to obtain, thus presaging a time when such fuels will not be available as a source of energy to run generators to provide all the electricity needed. The use of atomic energy for electrical generation is also facing difficulties due to the pollution of the environment and the danger inherent in the use of atomic reactors. Consequently, there is a great deal of present concern relative to generation of electricity to meet national needs to the point where other sources of energy, such as geothermal energy and solar energy are being surveyed and attempts are being made to utilize them. None of these sources, however, is presently satisfactory either because technology is inadequate or the expense involved in converting such energy source into electrical energy is prohibitive.

Attempts have been made in the past to utilize river currents as a source of energy, but these have proven inadequate due to the low level of electricity produced as well as the fact that navigation on the rivers or streams utilized is impeded. What has not been possible has been an efficient utilization of ocean and sea currents for the generation of electricity due to the fact that present apparatus for converting such current to electrical energy is highly inefficient.

SUMMARY OF THE INVENTION

An improved generating apparatus has now been found which will efficiently and inexpensively convert ocean current into electrical energy.

Briefly stated, the present invention comprises a submarine electrical energy generating apparatus comprising an electrical generator in a waterproof compartment, a turbine comprising a rotatable shaft having dual pitched wheel vanes extending therefrom and louvers pivotally mounted on said vanes in such manner and so structured so as to be under the constant control of the water current, and means operatively associated with said shaft and said generator for transmitting movement from the shaft to the generator.

DETAILED DESCRIPTION

Figure 1:
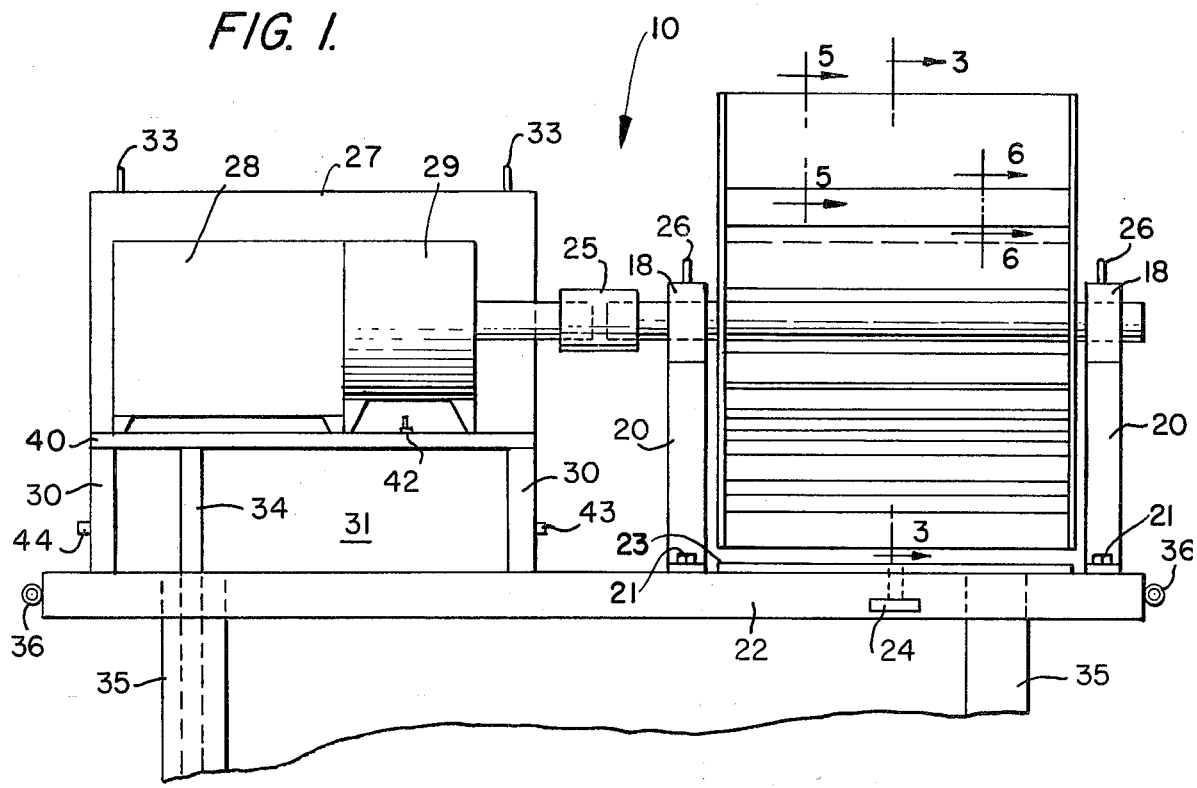
FIG. 1 is an elevational front view of an embodiment of the present invention.

Referring to the drawings, there is shown a submarine electrical energy generating apparatus 10 comprising a turbinewater wheel 11 consisting of a series of dual pitched extended wheel vanes 12 on spokes 13 attached, as by welding to shaft 14 and to rims 15. Each wheel vane comprises a plurality of pivotal louvers 16. Such louvers must be made of hollow or of lightweight metal lighter than water so as to be under the complete control of the ocean current as hereinafter described.

Figure 3:
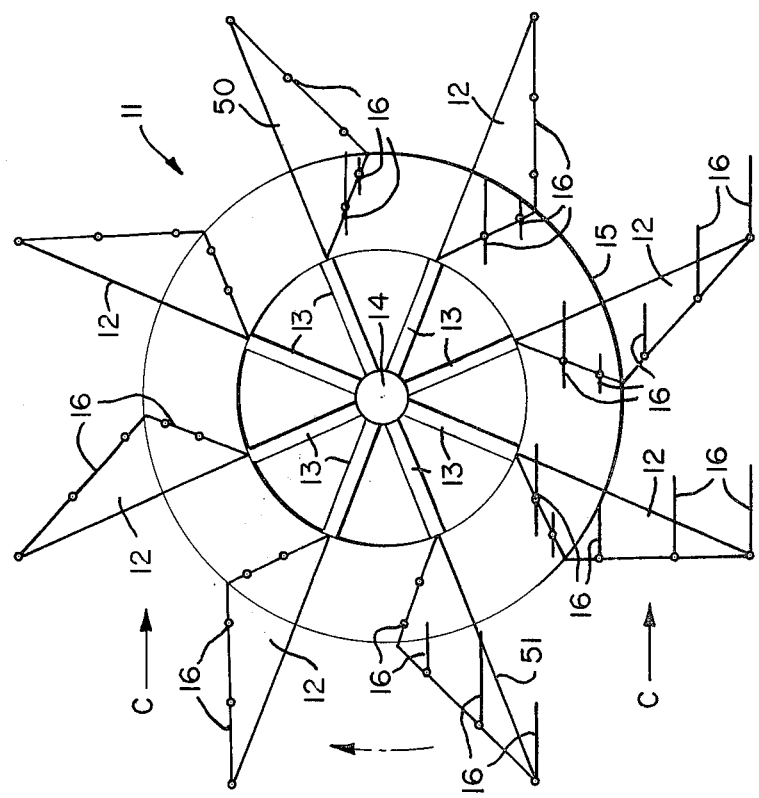
FIG. 3 is an enlarged vertical sectional view taken along the line 3—3 of FIG. 1.

In the embodiment depicted, the louvers 16 are hollow and are attached to the wheel vanes 12 on journals 45, preferably made of a strong plastic, such as Teflon, which are secured by bolts (not shown) to the inside of the rims 15 and insides of the vanes 12. Stops 17 are situated so as to further control the position and limit movement of the louvers 16 thereby permitting the louvers to ride in a horizontal (open) position when moving in opposition to the current and the oblique or vertical (closed) position when moving in sympathy with the current. This is best illustrated in FIG. 3 in which arrows C indicate the ocean current. It will be noted that, by virtue of the direction of the current given in this figure, the turbine will revolve clockwise. An important feature of the present invention is that the louvers 16 will be in a closed position at a point below the center of the shaft on which the vanes are mounted, thus permitting the greatest utilization of the energy from the current.

The shaft 14 is secured in two journals 18, preferably made of plastic, such as Teflon, which are, in turn, fastened by means of bolts 19 to a forked frame 20. The frame is secured by means of bolts 21 to a support structure 22 preferably one made of either metal or concrete. On top of each journal 18 is a hoist bracket 26 to facilitate removal to the surface of the entire turbine-water wheel assembly 11 for purposes of repair and/or replacement. The plastic journals 18 can also be removed utilizing bracket 26.

Removal is accomplished by first raising a controlled baffle plate 23 by means of a power unit 24 mounted inside the frame structure. This shields the current and stops it from flowing against the turbine 11, thus bringing it to a complete stop. A coupling 25 can then be disconnected to free the linkage. Means, such as cables, can then be placed about the rims 15, the journals 18 loosened, the water wheel slightly raised, and the journals replaced. It will be obvious that after the journals 18 have been replaced, the wheel 11 need only be replaced and repositioned to the coupling. The turbine-water wheel 11 can also be removed by unhooking the linkage as described.

A sealed compartment 27 is provided in which are housed a generator 28 and a geared transmission 29, both supported on the floor 40 of the compartment 27. The compartment is, in turn, secured to the support frame structure 22 by legs 30 leaving an open area 31 therebelow which offers no resistance to the current. An airlock passageway 32 is provided for entry to and exit from the sealed compartment 27. Minor repairs can, of course, be made in the sealed compartment 27, while it is in position. In the case of major repairs or replacement needs, the complete sealed compartment 27 can be hoisted to the surface by its hoist brackets 33, just as can be done with the turbine-water wheel 11. In this case, the coupling 25 is disconnected, cables are attached to the hoisting brackets 33 of the sealed compartment 27. The electrical conduit 34 is disconnected and capped. The sealed compartment 27 is then loosened from the support frame structure 22 and raised to the surface while another complete sealed compartment 27 is lowered into its position.

Figure 2:
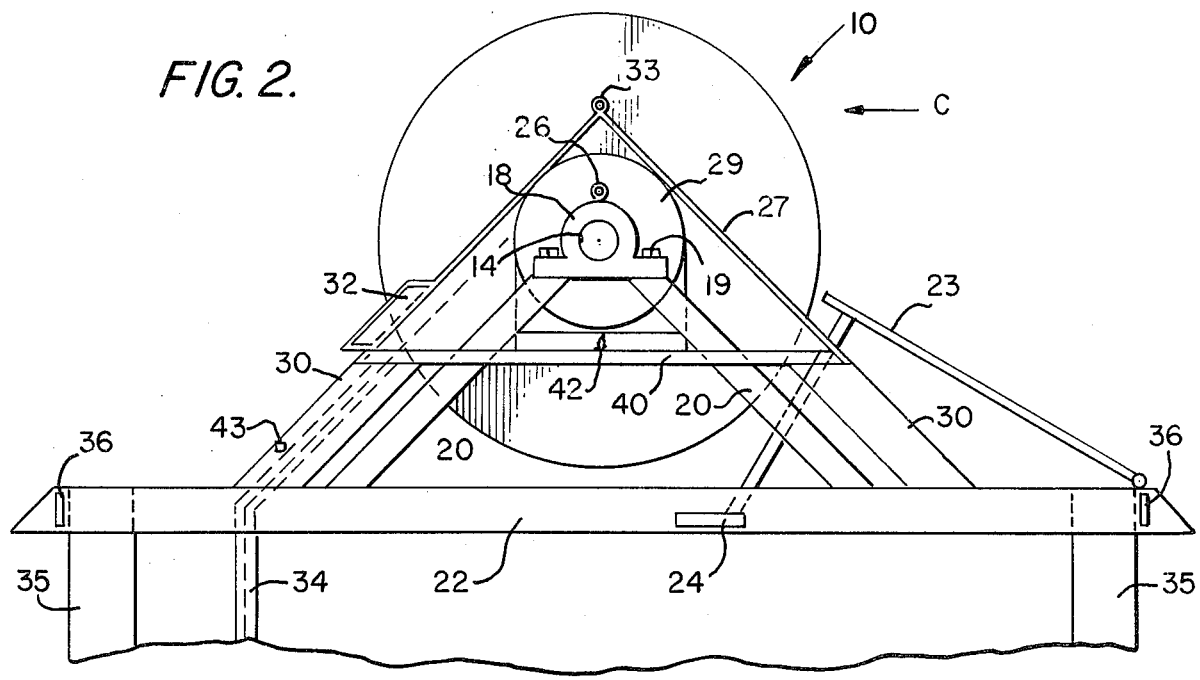
FIG. 2 is an elevational side view of an embodiment of the present invention.

Pylons 35, best shown in FIGS. 1 and 2, are driven into position and the entire submarine electrical energy generating apparatus 10 is lowered from the surface, set upon and secured to pylons 35. Towing brackets 36 are provided for towing the entire submarine electrical energy generating apparatus 10 to its location and for its lowering onto and raising up from its position upon the pylons 35.

Referring to FIG. 3, the hollow, floatable and pivotal louvers 16 of vane 50 within the rim 15 are open while the hollow, floatable and pivotal louvers 16 contained outside the rims 15 are closed, thereby causing oblique resistance to the current, forcing that portion of the turbine-water wheel 11 to revolve downward (clockwise) from a point above the center line of the shaft 12. At the same time, on wheel vane 51 located just below the center of shaft 14, the hollow, floatable and pivotal louvers 16 contained within the rims 15 are closed while the extended hollow, floatable and pivotal louvers 16 are open, thereby causing oblique resistance to the current, forcing that portion of the turbine-water wheel 11 to revolve upwards, (clockwise).

Because the outer portions of the wheel vanes 12 move faster through the water than the inner portions, the hollow, floatable and pivotal louvers 16 will open slightly, as necessary to release the back-pressure, thereby enhancing the efficiency of the turbine-water wheel 11.

Figure 5:
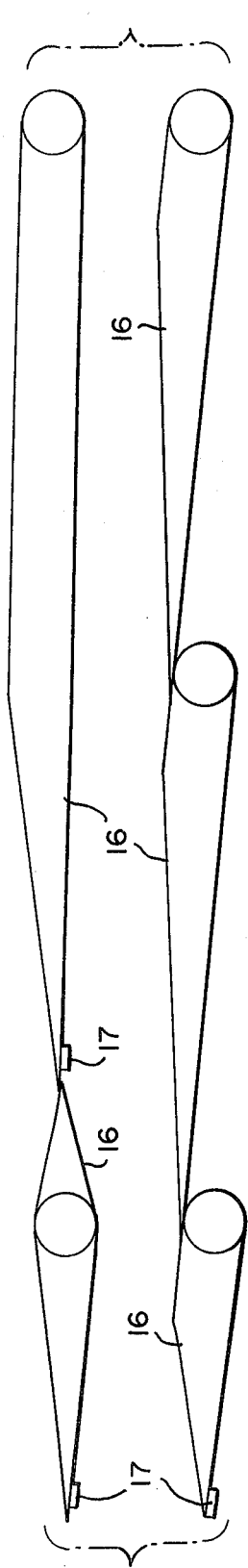
FIG. 5 is an enlarged vertical sectional view taken along line 5—5 of FIG. 1.
Figure 6:
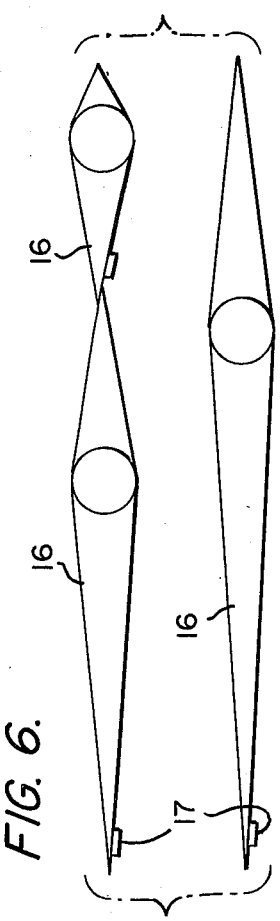
FIG. 6 is an enlarged vertical sectional view taken along line 6—6 of FIG. 1.

In FIG. 5 and FIG. 6 there are shown preferable arrangements of the hollow, floatable and pivotal louvers 16, positioned in relationship to each other so that each one is recessed at its contact points so that the current is forced to hold them in a closed position.

Figure 4:
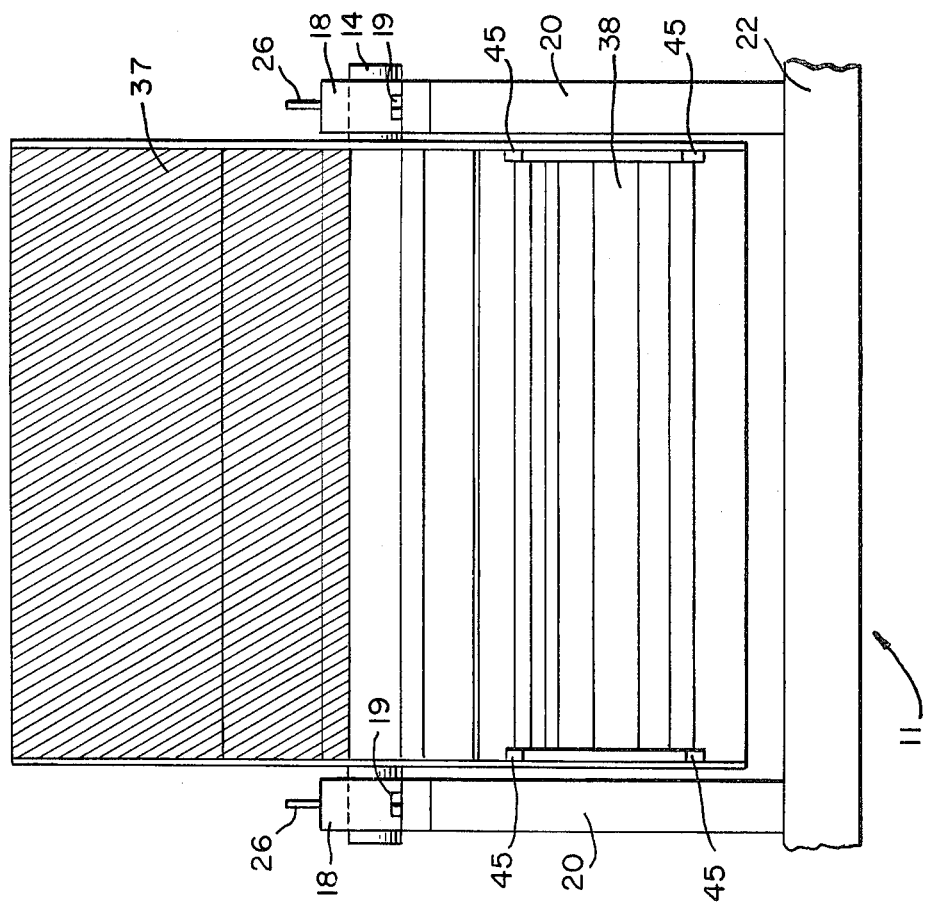
FIG. 4 is an enlarged front view of the turbine of the instant invention.

In FIG. 4, shaded area 37 shows the upper portion of the turbine-water wheel 11 closed and resisting the current while unshaded area 38 shows lower portion of turbine-water wheel 11 open, thereby allowing the current to pass through freely and without obstruction, causing the turbine-water wheel 11 to revolve clockwise. Should the current reverse its direction, the lower portion 38 of the turbine-water wheel 11 would close and the upper portion 37 of the turbine-water wheel 11 would open causing the turbine-water wheel 11 to continue to revolve in the same direction (clockwise).

Figure 7:
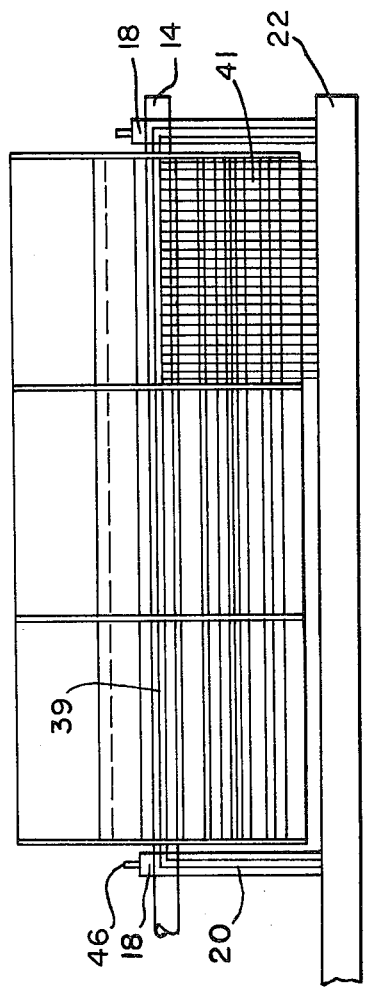
FIG. 7 is a diminished front view showing an extension of the turbine of the instant apparatus.

If large particles in suspension become a problem, the open, in this disclosure lower, portion of the turbine-water wheel 11 would be affected only, because such particles would become lodged during the time the hollow, floatable and pivotal louvers 16 return to their closed positions. To remedy the problem, a device 39, shown in FIG. 7, with a series of vertically suspended members 41 can be hung in front of and in the proximity of the lower portion of the turbine-water wheel 11 to trap all such large suspended particles. All suspended particles coming in contact with the upper, closed portion of the turbine-water wheel would be set free when the louvers return to an open position. In this manner, such device will not interfere with the function of the turbine-water wheel 11.

If, at any time, water should enter the sealed compartment 27, a moisture sensor 42 will actuate the power unit 24, thereby raising the control baffle plate 23 to stop the turbine-water wheel 11, the geared transmission 29, the electrical generator 28 and the generating of all electrical energy. If, for any other reason, the complete system needs to be stopped, it can be done so by means of sealed switches at positions 43 and 44.

It is preferred to coat all parts of the wheel 11 with a coating which will inhibit marine growth. Any of the materials conventionally used for this purpose, such as marine paints, can be utilized. Especially effective are coatings which slowly release biocides to prevent such marine growth.

While the instant invention has been described with respect to the use of pylons to secure the apparatus on the ocean floor, it is within the scope of the present invention to utilize guy cables attached to bases on the ocean floor to moor a floatable version of the apparatus 10. The apparatus 10 can be made floatable by means of conventional flotation tanks. The cables can be of any length desired, thus enabling the floatable apparatus to be positioned at any desired distance above the ocean floor to take advantage of the most desirable, suitable current. In this embodiment, suitable bases are first attached to the ocean floor to which one end of the cables of the desired length can be attached with the other end of the cables affixed to the apparatus to moor the same.

Herein, movement of the wheel has been described as "clockwise." It will be evident that the movement can be "counterclockwise" if desired.

While the invention has been described in connection with a preferred embodiment, it is not intended to limit the invention to the particular form set forth, but, on the contrary, it is intended to cover such alternatives modifications and equivalents as may be included within the spirit and scope of the invention as defined by the appended claims.

What is claimed is:

1. Electrical energy generating apparatus comprising an electrical generator, a turbine comprising a rotatable shaft having a plurality of dual pitched wheel vanes extending therefrom and louvers pivotally mounted on said vanes and so structured so as to be under the constant control of water current, each of said dual pitched vanes having at least one louver pivotally mounted on a first portion of each said vanes and at least one louver pivotally mounted on a second portion of each said vanes, such that whenever one of said vanes is moving from a point just below to a point just above the centerline of said shaft said louver on said first portion is closed, whereas said louver on said second portion is open, and whenever each of said vanes is moving from a point just above to a point just below the centerline said louver on said first portion is open, whereas said louver on said second portion is closed, and means operatively associated with said shaft and said generator for transmitting movement of the shaft to the generator.

2. The apparatus of claim 1, in which the elements of the turbine are coated with an anti-fouling coating.

3. The apparatus of claim 1, including a movable baffle plate positioned so as to be moved to and from a position between the current and the turbine to regulate action of the current on the turbine.

4. The apparatus of claim 3, in which each individual vane has at least two louvers which interlock when brought into contact with the vane due to action of the water current.

5. The apparatus of claim 1 wherein said transmitting means comprises a geared transmission coupled to said shaft.

6. The apparatus of claim 1 wherein the wheel vanes and louvers are so structured that those closed louvers at a point just below the center line of said rotatable shaft will be pushed in a direction in harmony with the vanes above the center line of said shaft.

7. The apparatus as set forth in claim 1 in which said louvers on said first and second portions on each of said vanes are closed during a portion of their movement above the centerline to form a bucket for receiving the forces of fluid current, and are open during a portion of their movement below the centerline.

* * * * *